United States Patent

Kuhm et al.

[11] Patent Number: 5,569,694
[45] Date of Patent: Oct. 29, 1996

[54] GARNET-CONTAINING STABILIZER MIXTURES FOR POLYMERS

[75] Inventors: Peter Kuhm, Hilden; Frido Loeffelholz; Peter Wedel, both of Bremerhaven; Bernd Wegemund, Haan, all of German Dem. Rep.

[73] Assignee: Henkel Kommanditgesellschaft auf Aktien, Duesseldorf, Germany

[21] Appl. No.: 436,283

[22] PCT Filed: Nov. 8, 1993

[86] PCT No.: PCT/EP93/03114

§ 371 Date: Jun. 19, 1995

§ 102(e) Date: Jun. 16, 1995

[87] PCT Pub. No.: WO94/11431

PCT Pub. Date: May 26, 1994

[30] Foreign Application Priority Data

Nov. 16, 1992 [DE] Germany ............... 42 38 567.9

[51] Int. Cl.$^6$ ............... C08K 5/098; C08K 9/04; C09K 15/32
[52] U.S. Cl. ............... 524/399; 524/400; 523/205; 252/400.52; 252/400.61
[58] Field of Search ............... 252/400.52, 400.61; 524/399, 400; 523/205

[56] References Cited

U.S. PATENT DOCUMENTS

| | | | |
|---|---|---|---|
| 4,740,538 | 4/1988 | Sekutowski | 523/205 |
| 4,963,608 | 10/1990 | Kunieda et al. | 524/399 |
| 5,143,959 | 9/1992 | Carette et al. | 524/399 |
| 5,214,090 | 5/1993 | Moriyama et al. | 524/399 |
| 5,234,981 | 8/1993 | Arfiche et al. | 524/399 |
| 5,241,094 | 8/1993 | Razvan et al. | 524/399 |
| 5,252,645 | 10/1993 | Nosu et al. | 524/399 |
| 5,312,941 | 5/1994 | Razvan et al. | 524/399 |
| 5,350,785 | 9/1994 | Sander et al. | 524/400 |
| 5,352,723 | 10/1994 | Tanno et al. | 524/399 |
| 5,356,567 | 10/1994 | Ogawa et al. | 252/400.52 |
| 5,419,883 | 5/1995 | Ogawa et al. | 252/400.52 |
| 5,451,628 | 9/1995 | Baker | 524/400 |

FOREIGN PATENT DOCUMENTS

| | | |
|---|---|---|
| 0508857 | 10/1992 | European Pat. Off. . |
| 2412837 | 10/1974 | Germany . |
| 2424763 | 12/1975 | Germany . |
| 2553409 | 8/1976 | Germany . |
| 2716389 | 2/1978 | Germany . |
| 3019632 | 11/1981 | Germany . |
| 3811493 | 10/1989 | Germany . |
| 3941902 | 2/1991 | Germany . |
| 4117035 | 11/1992 | Germany . |
| 4114034 | 11/1992 | Germany . |
| 2213154 | 8/1989 | United Kingdom . |
| 9206135 | 4/1992 | WIPO . |

OTHER PUBLICATIONS

Acta Cryst. 23 (1967), pp. 220 to 225.
"Rock–Forming Minerals Orthosilicates", vol. 1A, subchapter Garnet Group, 2nd Edition, edited by Deer, Howie and Zussman, Langman, London/New York, 1982, pp. 468 to 474 and 649 to 657.
"The crystal Structure of katoite and Implications Within the Hydrogrossular Group of Minerals" in Bull. Mineral. 108 (1985), pp. 1 to 8 and Katoite, A New Member of the Ca3A(SiO4)3–Ca3Al2(oh)12 Series and a New Nomenclature for the Hydrogrossular Group of Minerals in Bull. Mineral. 107 (1984), pp. 605 to 618.
cf. Ullman's Encyclopaedie der technischen Chemie, vol. 19, 4th Edition, pp. 2–11, 1980.
Ullmann's Encyclopaedie der technischen Chemie, vol. 16, 4th Edition, pp. 254–257, 1978.

*Primary Examiner*—Peter A. Szekely
*Attorney, Agent, or Firm*—Wayne C. Jaeschke; John Daniel Wood; Daniel S. Ortiz

[57] ABSTRACT

Stabilizer mixture for polymers based on halogen-containing vinyl monomers are provided. The stabilizers contain:

a) calcium soaps of $C_{8-32}$ fatty acids,
b) zinc soaps of $C_{8-32}$ fatty acids, and
c) garnets corresponding to formula (I):

$$\left[ M_x^I M_{3-\frac{x}{2}}^{II} M_{2-y}^{III} M_y^{IV} \right] (OH)_{z-y} O_y (A^n)_m \quad (I)$$

in which
$M^I$ is at least one alkali metal ion
$M^{II}$ is at least one divalent metal ion
$M^{III}$ is at least one trivalent metal ion
$M^{IV}$ represents titanium and/or zirconium ions
$A^n$ is at least one n-valent acid anion with the charge n=1, 2, 3 or 4 and the following conditions apply: $0 \leq x < 1$, $0 \leq y < 1$, $0 \leq z \leq 12$, $0 < m$, where $y < z$ and $n \cdot m + z = 12$, wherein said garnets are optionally surface-modified.

Such garnets are characterized by a specific crystal lattice which distinguishes them from other alkaline earth metal aluminates, such as the hydrotalcites.

17 Claims, No Drawings

GARNET-CONTAINING STABILIZER MIXTURES FOR POLYMERS

BACKGROUND OF THE INVENTION

1. Field of the Invention

The present invention relates generally to stabilizers for polymers based on halogen-containing vinyl monomers and, more particularly, to stabilizer mixtures which, in addition to calcium and zinc soaps, also contain optionally surface-modified garnets.

2. Discussion of Related Art

It is known that halogen-containing plastics or even the molding compounds produced from them tend to eliminate hydrogen chloride under the effect of heat and UV light, which promotes the decomposition and discoloration of the halogen-containing plastic or molding compound. Hitherto, the traditional heavy metal compounds based on lead, barium and/or cadmium have been used to counteract this decomposition and discoloration. However, from the industrial hygiene and ecological point of view, there is a need to replace these entirely effective stabilizers by safer compounds. Although stabilizer mixtures containing calcium and zinc soaps have established themselves in this regard over recent years, they always require additional co-stabilizers to develop an acceptable performance level. The co-stabilizers may be both inorganic and organic. Hydrotalcites with small BET surfaces are proposed as inorganic co-stabilizers in DE-C-30 19 632. Hydrotalcites are layer compounds which generally contain layers of magnesium-containing hydroxyaluminates in which magnesium and aluminium ions are statistically distributed, the hydroxyl groups often being partly replaced by carbonate groups. In order to improve the compatibility of these hydrotalcites in the halogen-containing plastics, it is recommended in the published German patent application to surface-modify the hydrotalcites with fatty acid esters, anionic surfactants or coupling agents. Although hydrotalcites are effective stabilizers, they are difficult to produce and, hence, are expensive.

It is known from DE-C-39 41 902 that basic calcium/aluminium hydroxyphosphites can be used to stabilize PVC. The calcium aluminates described in this document also appear to be layer compounds like the hydrotalcites. Besides these two types of layer compounds, calcium silicates, titanates and aluminates are known as stabilizer constituents for PVC from DE-C-27 16 389 and from DE-B-25 53 409. In many cases, however, these compounds cannot be adequately dispersed in PVC and, in addition, show a poor stabilizing effect.

The problem addressed by the present invention was to provide a stabilizer for polymers based on halogencontaining vinyl monomers which would be easy to produce and which could readily be dispersed in the plastic. In addition, the stabilizers would enhance the stabilizing effect of calcium and zinc soaps so that the plastic would retain a good light initial color for long periods under the effect of heat and/or UV light, only becoming dark in color at a much later stage, indicating the failure of the stabilizer mixture.

SUMMARY OF THE INVENTION

Surprisingly, the problem stated above has been solved by the use of certain garnets corresponding to formula (I) in addition to calcium and zinc soaps. Accordingly, the present invention relates to stabilizer mixtures for polymers based on halogen-containing vinyl monomers containing a) calcium soaps of $C_{8-32}$ fatty acids b) zinc soaps of $C_{8-32}$ fatty acids c) optionally surface-modified garnets corresponding to formula (I):

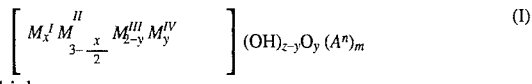

in which $M^I$ is at least one alkali metal ion $M^{II}$ is at least one divalent metal ion $M^{III}$ is at least one trivalent metal ion $M^{IV}$ represents titanium and/or zirconium ions $A^n$ is at least one n-valent acid anion with the charge n=1, 2, 3 or 4 and the following conditions apply:
 $0<x<1$, $0<y<1$, $0<z<12$, $0<m$, where $y<z$ and $n \cdot m+z=12$.

DETAILED DESCRIPTION OF THE INVENTION

Garnets corresponding to formula (I) are characterized by a specific crystal lattice which distinguishes them from other alkaline earth metal aluminates, such as the hydrotalcites. This crystal lattice has a space-filling three-dimensional structure derived from the basic type of katoite with the formula $Ca_3Al_2(OH)_{12}$. The crystal lattice together with lattice spacings of the basic katoite type is described in detail, for example, in the Article by C. Cohen-Addad and P. Ducros in Acta Cryst. 23 (1967), pages 220 to 225. According to this article, the aluminium ion in the basic type is octahedrally surrounded by 6 oxygen ions each bearing a hydrogen. The calcium ion is surrounded by 8 oxygen ions which form a disturbed cube also known as a three-face dodecahedron. In the garnets according to the invention, the calcium ion may be completely or partly replaced by other divalent metal ions $M^{II}$ with comparable ion radii or the divalent metal ions may even partly replaced by monovalent alkali metal ions $M^I$ corresponding to formula (I) providing the three-dimensional structure remains intact. Under the same conditions, the aluminium ion in the katoite structure may be completely or partly replaced by other trivalent metal ions $M^{III}$ with ion radii comparable with the radius of the aluminium ion. The trivalent metal ions may even be partly replaced by the tetravalent ions of titanium or zirconium. In principle, the calcium ions or aluminium ions are easier to replace by other ions, the more similar the ion radii of the ions to be replaced. The ion radii can be found in the known tabular compilations. Similarly, the hydroxyl groups of the katoite structure may be replaced by other n-valent anions, although it is preferred to select only those anions which are comparable with the hydroxyl groups in their ion radius. Suitable n-valent anions are carbonate, sulfate, sulfite, formate, nitrate, nitrite, phosphite, hydrogen phosphite, fluoride, chloride, borate, silicate, stannate, chlorate and perchlorate. Some of these garnets are natural minerals, such as hydrogrossular with the idealized formula $Ca_3Al_2Si_2O_8(SiO_4)_{1-m}(OH)_{4m}$ or henritermierte with the idealized formula $Ca_3(Mn,Al)_2(SiO_4)_2(OH)_4$. These and other natural garnets together with their space-filling crystal structures are described in "Rock-Forming Minerals Orthosilicates", Vol. 1A, subchapter "Garnet Group", 2nd Edition, edited by Deer, Howie and Zussmann, Langman, London/New York, 1982, pages 468 to 474 and 649 to 657. Some of the garnets corresponding to formula (I) have already been synthetically produced, cf. the Articles by E. Passaglia et al. entitled "The crystal Structure of Katoite and Implications Within the Hydrogrossular Group of Minerals" in Bull. Mineral. 108 (1985), pages 1 to 8 and "Katoite, A New Member of the $Ca_3Al_2(SiO_4)_3$—$Ca_3Al_2(OH)_{12}$ Series and a New Nomenclature for the Hydrogrossular Group of Minerals" in Bull. Mineral. 107 (1984), pages 605 to 618, other documents being cited in these Articles.

Garnets corresponding to formula (I), in which $M^I$ is a sodium ion, are particularly preferred for the purposes of the invention. The incorporation of the sodium ion in the space-filling crystal lattice of the garnets can be demonstrated by the energy-dispersive X-ray microanalysis (EDX) of corresponding garnet crystals, because the K-alpha line typical of the sodium ion occurs at 1.04 KeV in the analysis of the crystals. The quantity of sodium incorporated can also be determined by EDX.

In addition, garnets corresponding to formula (I), in which $M^{II}$ represents divalent metal ions selected from the group consisting of calcium, magnesium, iron, zinc and manganese are particularly preferred for the purposes of the invention. These divalent metal ions may be present in the garnet either individually or in the form of mixtures. In a particularly preferred embodiment, $M^{II}$ in formula (I) is a calcium ion.

In another embodiment of the invention, preferred garnets corresponding to formula (I) are those in which $M^{III}$ is a trivalent aluminium and/or iron ion, preferably an aluminium ion. Garnets corresponding to formula (I), in which $M^I$ is a sodium ion, $M^{II}$ is a calcium ion and $M^{III}$ is an aluminium ion, are particularly easy to obtain and are therefore preferred.

Within the group of these garnets, a subgroup which can be represented by formula (II):

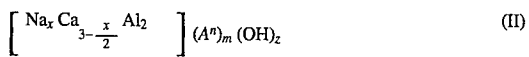 $(A^n)_m (OH)_z$      (II)

in which $A^n$ stands for silicate, borate, hydrogen phosphite and/or phosphite and the conditions $0 \leq x < 0.7$, $0 < m \leq 6$ and $0 \leq z < 12$ apply, is particularly suitable. The silicates and borates are preferably the ortho compounds.

The garnets corresponding to formula (I) and formula (II) may be prepared by methods known per se, cf. the above-cited literature references E. Passaglia et al. loc. cit. and C. Cohen-Addad loc. cit. Production in an aqueous system from the hydroxides or oxides of the particular metals involved is particularly easy to handle. The production of the garnets is described by way of example in the following with reference to the preferred garnets of formula (II) where A is a silicate. In accordance with DE-C-24 24 763, the garnets are produced from the oxides or hydroxides of calcium and aluminium by precipitation in an aqueous system in the presence of silicate ions which are preferably introduced in the form of waterglass. The presence of sodium ions—preferably introduced in the form of aqueous solutions of sodium hydroxide—is advisable in this case. In one particularly inexpensive production variant, precipitation is carried out in a sodium aluminate liquor of the type obtained in the Bayer process for the preparation of bauxite with a typical composition of 5 to 20% by weight of sodium ions, expressed as $Na_2O$, and 3 to 20% by weight of aluminium ions, expressed as $Al_2O_3$, by addition of calcium hydroxide or oxide in the presence of the silicate ions. The reaction mixture is then heated to temperatures of 50° to 150° C. The reaction is generally over after 0.1 to 10 hours, shorter reaction times being possible at higher temperatures. The reaction product formed is substantially insoluble in water and may be separated off, for example, by filtration. To remove the remaining water, it is advisable to dry the garnets. The quantities of calcium and aluminium ions used ideally correspond to a molar ratio of 3:2. Silicate ions may be present in a broad range, as the index n in formula (II) shows. Accordingly, the molar component of silicate ions may be above zero and below 6 from which it can be concluded that small quantities of hydroxyl groups represented by the index z are always present in the garnet. The quantity of sodium ions is determined on the one hand by the quantity of sodium ions initially introduced although, on the other hand, only limited quantities of sodium ions can be incorporated in the crystal lattice. Accordingly, it is advisable to use the sodium, calcium and aluminium ions in quantities corresponding to molar ratios of 0.1:2.95:2 to 0.7:2.65:2. Although it is possible to use larger quantities of sodium ions, they are no longer incorporated in the crystal lattice in accordance with the quantity used. Even if larger quantities of hydroxides or oxides of calcium or aluminium are used, this leads to garnets corresponding to the above formula which contain more than the stoichiometric quantities of hydroxides and oxides in addition to the garnets in unchanged form. These mixtures may also be used as stabilizers in accordance with the invention, although the content of unchanged hydroxides and oxides should be below 50% by weight and preferably below 30% by weight, based on the garnet mixture. It is of course also possible to remove the excess water-soluble components by washing.

Since the oxides or hydroxides of calcium used frequently contain the corresponding magnesium compounds in association as impurities, calcium-containing garnets corresponding to formula (I) or (II) generally still contain some magnesium ions. The magnesium component of the garnets corresponds at most to the quantities of magnesium impurities present in the calcium oxide or hydroxide. Corresponding garnets of formula (I) or (II) containing magnesium ions may also be used in accordance with the invention. In general, the percentage content of incorporated magnesium ions is at most 10% by weight of the theoretical quantity of calcium.

Particularly good stabilizing effects are achieved when the garnets have average particle diameters of 0.1 to 100 μm and preferably 0.5 to 30 μm, as determined by the laser diffraction method using a Sympathec Helos. Garnets such as these can be incorporated particularly easily and uniformly in the polymers. Particle diameters in the range mentioned can be obtained by carrying out the reaction at the temperatures mentioned and over the reaction times mentioned.

If desired, the garnets corresponding to formula (I) or (II) may be surface-modified with dispersants. The garnets are preferably surface-modified with one or more additives selected from the following groups:
a) optionally alkoxylated alcohols containing one or more hydroxyl groups
b) partly or completely epoxidized unsaturated fatty acids, fatty alcohols and/or derivatives thereof
c) full and partial esters of polyols containing 3 to 30 carbon atoms and 2 to 6 hydroxyl groups with carboxylic acids containing 6 to 22 carbon atoms
d) alkyl and aryl phosphites
e) homopolymers and copolymers of acrylic acid and methacrylic acid
f) lignin and naphthalene sulfonates and/or trimer fatty acids
g) salts of fatty acids.

Additives belonging to group a) include both monohydric alcohols and polyols containing 3 to 30 carbon atoms and 2 to 6 hydroxyl groups which may optionally be alkoxylated, preferably ethoxylated. Within the group of monohydric alcohols, fatty alcohols containing 6 to 22 carbon atoms, such as capric, lauryl, palmityl, stearyl, oleyl, linoleyl, arachidyl and behenyl alcohol, and the technical mixtures thereof obtainable from natural oils and fats are preferably used. Among these fatty alcohols, ethoxylated representatives containing 2 to 15 moles of ethylene oxide are most particularly preferred. Within the group of polyols, diols containing 3 to 30 carbon atoms, such as butanediols, hexanediols, dodecanediols, and also trimethylol propane, pentaerythritol, glycerol and technical oligomer mixtures thereof with average degrees of condensation of 2 to 10 are suitable. Within the group of polyols, those containing 3 to 30 carbon atoms and at least one hydroxyl group or an ether oxygen for every 3 carbon atoms, preferably glycerol and/or the technical oligoglycerol mixtures with average degrees of condensation of 2 to 10, are most particularly preferred.

The additives of group b) are partly or completely epoxidized unsaturated fatty acids or fatty alcohols containing 6 to 22 carbon atoms or derivatives thereof. Suitable derivatives of the epoxidized fatty acids or fatty alcohols are, in particular, the esters, the epoxidized fatty acids and epoxidized fatty alcohols being esterified with one another or even with non-epoxidized carboxylic acids or with non-epoxidized monohydric or polyhydric alcohols. The epoxidized fatty acids are preferably derived from unsaturated palmitoleic, oleic, elaidic, petroselic, ricinoleic, linolenic, gadoleic or erucic acid which may be completely or partly epoxidized by known methods. The epoxidized fatty alcohols are preferably derived from the unsaturated alcohols oleyl, elaidyl, ricinoleic, linoleyl, linolenyl, gadoleyl, arachidonic or erucic alcohol which may also be completely or partly epoxidized by known methods. Suitable esters of epoxidized fatty acids are esters of monohydric, dihydric and/or trihydric alcohols which are completely esterified with epoxidized unsaturated carboxylic acids containing 6 to 22 carbon atoms, such as methyl, 2-ethyl hexyl, ethylene glycol, butanediol, neopentyl glycol, glycerol and/or trimethylol propane esters of epoxidized lauroleic acid, palmitoleic acid, oleic acid, ricinoleic acid, linoleic acid and/or linolenic acid. Esters of trihydric alcohols and substantially completely epoxidized unsaturated carboxylic acids containing 12 to 22 carbon atoms are preferred, esters of glycerol with substantially completely epoxidized unsaturated carboxylic acids containing 12 to 22 carbon atoms being most particularly preferred. As usual in oleochemistry, the epoxidized carboxylic acid glycerides may also be technical mixtures of the type obtained by epoxidation of natural unsaturated fats and unsaturated oils. Epoxidized rapeseed oil, epoxidized soybean oil and epoxidized sunflower oil from new plants are preferably used.

The additives of group c) are full esters or partial esters obtained by the relevant methods of preparative organic chemistry, for example by acid-catalyzed reaction of polyols with carboxylic acids. Suitable polyol components are those already mentioned in connection with the group a) additives. Preferred acid components are aliphatic, saturated and/or unsaturated carboxylic acids containing 6 to 22 carbon atoms, such as caproic acid, caprylic acid, capric acid, lauric acid, myristic acid, palmitic acid, palmitoleic acid, stearic acid, oleic acid, ricinoleic acid, linoleic acid, linolenic acid, behenic acid or erucic acid. As usual in oleochemistry, the carboxylic acid component may even be a technical mixture of the type obtained in the pressure hydrolysis of natural fats and oils. Partial esters of glycerol, more particularly partial esters of technical oligoglycerol mixtures with average degrees of condensation of 2 to 10, with saturated and/or unsaturated aliphatic carboxylic acids containing 6 to 22 carbon atoms are preferred.

Finally, the group d) additives include alkyl and aryl phosphites, preferably those corresponding to general formula (III):

in which $R^2$, $R^2$ and $R^3$ independently of one another represent an alkyl radical containing 1 to 18 carbon atoms or a phenyl radical. Typical examples of group d) additives are tributyl phosphite, triphenyl phosphite, dimethyl phenyl phosphite and/or dimethyl stearyl phosphite. Diphenyl decyl phosphite is preferred.

The group e) additives are preferably polymers of acrylic acid and methacrylic acid and copolymers thereof. The term "copolymers" in the present context encompasses both pure copolymers of acrylic acid and methacrylic acid and copolymers of (meth)acrylic acid with other vinylically unsaturated polymerizable monomers. Examples of other polymerizable monomers are unsaturated monomers containing sulfonic and phosphonic acid groups, unsaturated aliphatic carboxylic acids containing 3 to 5 carbon atoms, amides of unsaturated aliphatic carboxylic acids containing 3 to 5 carbon atoms, unsaturated monomers containing amino groups and/or salts thereof, vinyl acetate, acrolein, vinyl chloride, acrylonitrile, vinylidene chloride, 1,3-butadiene, styrene, alkyl styrenes containing 1 to 4 carbon atoms in the alkyl radical. Examples of group e) additives are polyacrylic acid, polymethacrylic acid (acrylic acid and methacrylic acid and their derivatives are referred to hereinafter in short as (meth)acrylic acid or derivatives) and/or salts thereof, such as polysodium (meth)acrylate, copolymers of (meth)acrylic acid with maleic acid, maleic anhydride, styrene sulfonic acid, a-methyl styrene, 2-vinyl pyridine, 1-vinyl imidazole, dimethyl aminopropyl (meth)acrylamide, 2-(meth)acrylamido-2-methyl propane sulfonic acid, (meth)acrylamide, N-hydroxydimethyl (meth)acrylamide and/or salts thereof. Among the polymeric additives, those with a predominantly anionic character, i.e. which mostly contain acid groups in free or salt form, are most particularly preferred. Polymers of (meth)acrylic acid and copolymers thereof with styrene, acrolein, alkyl styrenes containing 1 to 4 carbon atoms in the alkyl radical, styrene sulfonic acid, maleic acid and/or salts thereof, more particularly sodium salts, and maleic anhydride are particularly preferred. The polymeric additives of group e) best have a molecular weight of 1,000 to 10,000. The polymeric additives may be produced by known methods, such as bulk or solution polymerization (cf. Ullmann's Encyclopedic der technischen Chemic, Vol. 19, 4th Edition, pages 2–11, 1980).

The group f) additives are commercial products. A process for the production of lignin sulfonates is described, for example, in Ullmann's Encyclopädic der technischen Chemic, Vol. 16, 4th Edition, pages 254–257, 1978. Trimer fatty acids are also commercial products which are obtained as residue in the distillation of dimer fatty acid (Empol® 1040 or Empol 1043, products of Henkel Corporation).

The additives of group g) are salts of fatty acids. Suitable fatty acids were mentioned above in connection with the additives of group c). The alkali metal salts of saturated fatty acids are preferred.

According to the invention, one or more additives from one or more of groups a) to g) may be used to modify the garnets, the total quantity of additive being 0.1 to 10% by weight, based on garnet. Where the polymeric additives e) are combined with other additives from groups a) to d) and f) to g), it is preferred to have the polymeric additives in quantities of 50 to 90% by weight, based on the total quantity of additives. Among the surface-modified garnets, those modified with additives from groups b), e) and g) either individually or in admixture with one another are particularly preferred.

The garnets may be modified either in situ or subsequently.

In cases where they are subsequently modified, the garnets are thoroughly ground with organic or aqueous solutions of the additives, preferably in grinding mills and, more particularly, in a ball mill, and subsequently dried in the usual way. If the additives are products liquid at room temperature or low-melting products, solutions thereof should not of course be used. Otherwise clear aqueous solutions or solutions in polar organic solvents are best used in the case of additives a) to g).

In the context of the invention, polar organic solvents are understood to be hydrocarbon compounds liquid at room temperature (15° to 25° C.) which bear at least one substituent more electronegative than carbon. Hydrocarbon compounds such as these include chlorinated hydrocarbons, alcohols, ketones, esters, ethers and/or glycol ethers. Suitable polar organic solvents are methanol, ethanol, n-butanol, acetone, methyl ethyl ketone, methyl isobutyl ketone, cyclohexanol, isophorone, ethyl acetate, lactic acid ethyl ester, 2-methoxyethyl acetate, tetrahydrofuran, ethylene glycol monomethyl ether, diethylene glycol monoethyl ether.

To ensure that the surface of the garnets can be uniformly modified, it is best where additives of group e) are present for these additives to be soluble in polar organic solvents of the type described and/or in water with pH values of 8 to 12. The expression "soluble" in this context means that at least 0.01% by weight and preferably 0.1% by weight, based on solution, of the polymeric additives e) are clearly dissolved in the polar organic solvents and in an aqueous solution with a pH value of 10 adjusted with alkali metal hydroxides at 20° C., particularly under the described conditions.

The garnets may also be modified in situ, i.e. the additives may be added—optionally in the form of their solutions—to the metal oxide or hydroxide solutions from which garnets corresponding to formula (I) or (II) are formed.

Lastly, however, both forms of modification may even be combined, which is advisable for modification with several additives, particularly additives differing from one another in their solubility.

The surface modification of the garnets may improve in particular their dispersion behavior in the polymers.

The optionally surface-modified garnets may be present in the stabilizer mixtures either on their own as an inorganic constituent or even in admixture with i) synthetic, crystalline, fine-particle alumosilicates containing 30 to 25% by weight of bound water with the composition 0.7 to 1.1 $Na_2O \cdot Al_2O_3 \cdot 1.3$ to 2.4 $SiO_2$, based on the anhydrous form, and/or ii) hydrotalcites and/or iii) hydrocalumites and/or iiii) calcined garnets.

The synthetic sodium alumosilicates i) are known zeolites of the NaA type which have an average pore diameter of 4 Å, so that they are also known as zeolites 4A. Sodium alumosilicates such as these may be prepared by known methods of the type described inter alia in DE-A-24 12 837. The mixtures of garnets and zeolites may be prepared either by subsequent mixing of the two classes of compounds or even in situ.

Thus, mixtures of garnets corresponding to formula (I) or (II) and zeolites are obtained in the production of garnets corresponding to formula (I) or (II), in which A is a silicate, and when the reaction mixtures for the production of these garnets contain sodium ions which are present in quantities of at least 10% by weight, based on the reaction mixture as a whole. In addition, the formation of such mixtures of garnets corresponding to formula (I) or (II), in which A is a silicate, and zeolites is promoted where reaction temperatures above 70° C. are applied. Under these conditions, mixtures containing up to 10% by weight of zeolites of the described type are obtained. If it is desired to have higher percentage contents of zeolites in the mixture or if it is desired not to use any silicate-containing garnets in admixture with zeolites, the constituents are best separately prepared and then mixed together.

Another inorganic constituent may be a hydrotalcite of the type known from DE-C-30 19 632 cited at the beginning. According to the present invention, however, the hydrotalcites need not have BET surfaces below 30 $m^2/g$, but instead may have larger surfaces providing they are modified with a dispersing additive. The additives mentioned under a) to g) may be used for modification. The modification and suitable modified hydrotalcites are also described in international application WO 92/06135 and in DE-A-41 17 035 and DE-A-41 14 034.

The hydrocalumites are also known compounds, for example from DE-C-39 41 902 cited above.

The calcined garnets are garnets corresponding to general formula (I) or (II) which have been calcined in standard ovens for at least 1 hour and preferably for 3 to 6 hours at temperatures above 400° C. and preferably at temperatures of 600° to 1,200° C. The exact composition of these calcined garnets is not known although, presumably, they are at least partly oxide mixtures.

The compounds i) to iiii) may be present either individually or in the form of mixtures with the garnets corresponding to formula (I) or (II). The content of compounds i) to iiii) is not critical, but is preferably in the range from 0 to 50% by weight, based on the mixture with garnets. Mixtures with garnets corresponding to formula (I) or (II), in which A is a silicate and m is a number of >0 and <1, and zeolites i) are particularly preferred.

The stabilizer mixtures according to the invention additionally contain zinc and calcium soaps of $C_{8-32}$ fatty acids, preferably saturated aliphatic fatty acids. Preferred zinc soaps are those of $C_{8-22}$ fatty acids, more particularly technical stearic acid which always contains considerable quantities of palmitic acid. These zinc soaps may be prepared in known manner by precipitation of zinc salts with monocarboxylic acids or directly from zinc oxide and monocarboxylic acid.

The calcium soaps like the zinc soaps are preferably those of aliphatic saturated fatty acids, preferably fatty acids containing 12 to 22 carbon atoms and, more preferably, technical calcium stearate which contains calcium palmitate.

Particularly preferred stabilizer mixtures contain 0.5 to 3 parts by weight of calcium soaps of $C_{8-32}$ fatty acids, preferably technical calcium stearate, 0.1 to 1 part by weight of zinc soaps of $C_{8-32}$ fatty acids, preferably technical zinc stearate and 1 to 5 parts by weight of garnets, optionally surface-modified garnets corresponding to formula (I) and preferably to formula (II).

In order further to improve the initial color of the chlorine-containing polymers, the stabilizer mixtures may additionally contain calcium complexes of 1,3-diketones.

The calcium complexes of 1,3-diketones which may be used in accordance with the invention are represented by formula (IV):

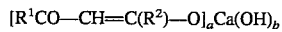
(IV)

in which

R¹ and R² may be the same or different and represent alkyl radicals containing 1 to 4 carbon atoms, phenyl or p-chlorophenyl radicals, a has a value of 1 to 2 and b has a value of 0 to 1, with the proviso that a+b=2.

The calcium complexes of 1,3-diketones are neutral compounds (a=2, b=0) or basic compounds (a=1, b=1). The groups R¹ and R² may represent a methyl, ethyl, propyl, butyl, phenyl or p-chlorophenyl radical. A calcium complex corresponding to formula (IV), in which the substituents R¹ and R² are the same and represent a methyl group, b=0 and a=2, i.e. calcium acetyl acetonate which is obtainable from 1 mole of calcium hydroxide and 2 moles of acetyl acetone, is preferred. Corresponding Ca complexes are described in DE-A-38 11 493.

Other additional constituents of the stabilizer mixture according to the invention include co-stabilizers, such as β-diketones, polyols and (polymeric) dihydropyridine derivatives. Suitable β-diketones are benzoyl acetone, stearoyl benzoyl methane, palmitoyl benzoyl methane, 4-methoxybenzoyl benzoyl methane, stearoyl acetone while suitable polyols are polyols containing 2 to 32 carbon atoms and 2 to 6 primary hydroxyl groups, such as propylene glycol, neopentyl glycol, trimethylol propane, pentaerythritol, glycerol and technical oligomer mixtures of glycerol and/or hydroxyfunctional isocyanurates, such as tris-(2-hydroxyethyl)isocyanurate. Dihydropyridine derivatives and also polymeric dihydropyridine derivatives are commercially available products.

In addition, it is possible to use antioxidants, such as esters of phosphorous acid with alkanols, phenols or polyols, and lubricants, such as partial esters of polyols containing 2 to 32 carbon atoms and 2 to 6 hydroxyl groups and monocarboxylic acids containing 6 to 22 carbon atoms or fatty acid esters. Plasticizers, such as epoxidized vegetable oils or phthalates, impact modifiers, such as copolymers based on (meth)acrylate-co-butadiene-co-styrene, flow improvers, such as methacrylate copolymers, pigments, fillers, flameproofing agents or even UV stabilizers, such as sterically hindered amine light stabilizers (HALS), may also be used.

The present invention also relates to the use of mixtures containing a) calcium soaps of $C_{8-32}$ fatty acids b) zinc soaps of $C_{8-32}$ fatty acids c) optionally surface-modified garnets corresponding to formula (I) in claim 1 and preferably to formula (II) in claim 7, as stabilizers for polymers based on halogen-containing vinyl monomers, more particularly PVC.

EXAMPLES

A) Production of the garnets

Example 1

111.7 g of a waterglass solution (composition: 8% by weight $Na_2O$ corresponding to 0.288 mole Na; 26.9% by weight $SiO_2$ corresponding to 0.5 mole Si, remainder water) and then 111.1 g of calcium hydroxide (corresponding to 1.5 mole Ca) suspended in 134.5 g of deionized water were added with intensive stirring at 90° C. to 433.7 g of sodium aluminate liquor (containing 14.6% by weight $Na_2O$ (corresponding to 2.04 moles Na), 11.35% by weight $Al_2O_3$ (corresponding to 1 mole Al) as hydroxocomplex). After 3 hours, the solid formed was filtered off, washed with water and dried at 110° C.

According to X-ray diffraction analysis (XDA), the solid contains more than 90% by weight of $Na_{0.4}Ca_{2.8}Al_2SiO_4(OH)_8$.

The average particle size as determined by the laser diffraction method using a Sympathec Helos is 22.1 μm.

Example 2

As in Example 1, 223 g of the waterglass solution of Example 1 (corresponding to 1 mole Si, 0.576 mole Na) and then 111.1 g of calcium hydroxide (corresponding to 1.5 mole Ca) suspended in 1,231.8 g of deionized water were added at 90° C. to 433.7 g of the sodium aluminate liquor described in Example 1. After 3 hours, a solid was filtered off, washed and dried.

According to XDA, the solid contains more than 90% by weight of $Na_{0.5}Ca_{2.75}Al_2(SiO_4)_2(OH)_4$, the rest being $Ca(OH)_2$.

The average particle size is 10.9 μm.

Example 3

The reaction was carried out as in Example 1 except that 252 g of disodium hydrogen phosphite (corresponding to 2 moles) were added to the sodium aluminate liquor before the beginning of the reaction and the reaction was carried out over a period of 5 hours at 90° C.

According to XDA, the solid contains >95% by weight of $Na_{0.4}Ca_{2.8}Al_{2.1}(SiO_4)(HPO_3)_{0.11}(OH)_{8.08}$; the rest is zeolite NaA. Energy-dispersive X-ray microanalysis (EDX) confirms that silicon, phosphorus, calcium, aluminium, oxygen and sodium are incorporated in these quantities. The average particle size is 2.1 μm.

Example 4

The reaction was carried out as in Example 1, except that 63 g of disodium hydrogen phosphite (corresponding to 0.5 mole) were additionally added 5 minutes before the end of the reaction (reaction time 5 hours).

The solid obtained has hydrogen phosphite adhering to its surface and, according to XDA, is similar in its composition to Example 1. The average particle size is 8.7 μm.

Example 5

The reaction was carried out as in Example 1, except that 252 g of disodium hydrogen phosphite (corresponding to 2 moles) were additionally added 5 minutes before the end of the reaction (reaction time 5 hours).

The solid obtained has hydrogen phosphite adhering to its surface and, according to XDA, is similar in its composition to Example 1. The average particle size is 8.7 μm.

Example 6

The reaction was carried out as in Example 1, except that 142.13 g of titanium tetraisopropylate (corresponding to 0.5 mole of Ti) were added instead of waterglass.

According to XDA, the solid almost exclusively contains $Na_{0.4}Ca_{2.8}Al_{0.82}Ti_{0.9}(OH)_{10.26}(O)_{0.9}$. The quantity ratios were determined by EDX. The average particle size is 3.5 μm.

Example 7

The reaction was carried out as in Example 1, except that 164.29 g of zirconium tetraisopropylate (corresponding to 0.5 mole of Zr) were added instead of waterglass.

According to XDA, the solid almost exclusively contains $Na_{0.3}Ca_{2.85}Al_{1.2}Zr_{0.6}(OH)_{10.8}(O)_{0.6}$. The quantity ratios were determined by EDX. The average particle size is 5 µm.

Example 8

The reaction was carried out as in Example 1, except that the quantity of waterglass solution was reduced to 55.85 g (corresponding to 0.25 mole Si).

According XDA, the solid contains >95% by weight of $Na_{0.4}Ca_{2.8}Al_2(SiO_4)_{0.5}(OH)_{10}$, the remainder is $Ca(OH)_2$. The average particle size is 1.9 µm.

Example 9

The reaction was carried out as in Example 1, except that 381.39 g of borax (corresponding to 4 moles of $BO_3$) were used instead of waterglass.

According to XDA, the solid contains approximately 85% by weight of $Na_{0.6}Ca_3Al_{2.3}(BO_3)_{1.25}(OH)_{9.75}$, remainder $Ca(OH)_2$. The average particle size is 4.5 µm.

Example 10

The reaction was carried out as in Example 9. After 3 hours, 3.78 g of sodium stearate were added to the reaction mixture which was then stirred for another 10 minutes at 90° C. The solid was filtered off, washed and dried. The solid is a product surface-modified with sodium stearate of which the composition, as determined by XDA, corresponds to Example 9. The average particle size is 8.0 µm.

Example 11

The reaction was carried out as in Example 1, except that 2% by weight—based on $Ca_3Al_2SiO_4(OH)_8$—of sodium stearate were added before the beginning of the reaction.

A solid surface-modified with sodium stearate is obtained, its composition is determined by XDA corresponding to Example 1. The average particle size is 20 µm.

Example 12

The reaction was carried out as in Example 1, except that 3% by weight of a copolymer of 46% by weight of styrene, 23% by weight of α-methyl styrene and 31% by weight of acrylic acid; molecular weight (weight average) 6,000 (copolymer 1) were additionally added before the beginning of the reaction.

A solid surface-modified with the copolymer is obtained, corresponding to Example 1 in its composition as determined by XDA. The average particle size is 14.2 µm.

Example 13

The reaction was carried out as in Example 1, except that 3% by weight of copolymer 1 and 2% by weight of sodium stearate—based on $Ca_3Al_2SiO_4(OH)_8$—were additionally added before the beginning of the reaction.

A product surface-modified with copolymer and sodium stearate is obtained, corresponding to Example 1 in its composition as determined by XDA. The average particle size is 14.6 µm.

B) Application test

Rolled sheets containing a stabilizer mixture of (in parts by weight)
0.25 calcium acetyl acetonate
0.7 technical zinc stearate
0.35 technical calcium stearate
0.2 tris(2-hydroxyethyl)isocyanurate
0.05 stearoyl benzoyl methane
2.5 garnets according to the Examples to 100 parts by weight of suspension polyvinyl chloride with a K value of 65 were tested for "static" stability. 8 Parts by weight of polyacrylate (impact modifier) and 4 parts by weight of chalk and 1.0 part by weight of titanium dioxide (fillers) were additionally present.

The stability of the polyvinyl chloride molding compound was tested by determining the static thermal stability of rolled sheets. To this end, polyvinyl chloride molding compound containing the stabilizer mixture was processed for 5 minutes to a test sheet on co-rotating Berstorff laboratory mixing rolls (450×220 mm) at a roll temperature of 170° C. and at a roll speed of 12.5 r.p.m. The approx. 0.5 mm thick sheet was cut into square test specimens with an edge length of 10 mm which were subsequently exposed to a temperature of 180° C. in a drying cabinet with 6 rotating shelves (Heraeus FT 420 R). Samples were taken at 15 minute intervals and examined for discoloration.

Table I below shows the time in minutes after which initial discoloration occurred and the time in minutes after which stability failure was observed in the form of dark brown discoloration of the test specimens.

TABLE I

| | Stability | |
|---|---|---|
| Katoite acc. to Ex. | Initial discoloration (in mins.) | Stability failure (mins.) |
| Basic formulation* | 15 | 45 |
| 1 | 45 | 90 |
| 2 | 30 | 90 |
| 3 | 45 | 75 |
| 4 | 45 | 105 |
| 5 | 45 | 105 |
| 6 | 45 | 90 |
| 7 | 45 | 90 |
| 8 | 45 | 105 |
| 9 | 45 | 75 |
| 10 | 45 | 75 |
| 11 | 45 | 90 |
| 12 | 45 | 90 |
| 13 | 45 | 90 |

*In the basic formulation, the stabilized PVC mixture was the same as mentioned under B), but without 2.5 parts of garnet.

We claim:
1. A composition of matter useful as a stabilizer for a polymer based on a halogen-containing vinyl monomer, said composition being a mixture comprising:
   a) calcium soaps of $C_{8-32}$ fatty acids,
   b) zinc soaps of $C_{8-32}$ fatty acids, and
   c) garnets of formula (I):

$$\left[ M^I_x M^{II}_{3-\frac{x}{2}} M^{III}_{2-y} M^{IV}_y \right] (OH)_{z-y} O_y (A^n)_m \quad (I)$$

in which:
   $M^I$ is at least one alkali metal ion
   $M^{II}$ is at least one divalent metal ion
   $M^{III}$ is at least one trivalent metal ion
   $M^{IV}$ represents titanium and/or zirconium ions
   $A^n$ is at least one n-valent acid anion with the charge n=1, 2, 3 or 4 and the following conditions apply:

$0 \leq x<1$, $0 \leq y<1$, $0 \leq z<12$, $0<m$, where $y<z$ and $n \cdot m+z=12$, wherein said garnets are optionally surface-modified.

2. A composition as claimed in claim 1 wherein $M^I$ in formula (I) is a sodium ion.

3. A composition as claimed in claim 1 wherein $M^{II}$ in formula (II) is a metal ion selected from the group consisting of calcium, magnesium, iron, zinc and manganese.

4. A composition as claimed in claim 1 wherein $M^{III}$ is selected from the group consisting of aluminum and trivalent iron ions.

5. A composition as claimed in claim 1 wherein $M^I$ is a sodium ion, $M^{II}$ is a calcium ion and $M^{III}$ is an aluminum ion.

6. A composition as claimed in claim 1 wherein A is an acid anion selected from the group consisting of carbonate, sulfate, sulfite, formate, nitrate, nitrite, phosphite, hydrogen phosphite, fluoride, chloride, borate, silicate, stannate, chlorate, and perchlorate.

7. A composition as claimed in claim 1 wherein said garnets have the formula (II):

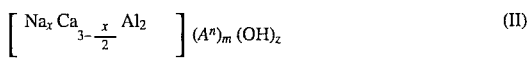  (II)

in which $A^n$ is selected from the group consisting of orthosilicate, borate, hydrogen phosphite, and phosphite, and wherein the conditions $0 \leq x<0.7$, $0<m \leq 6$ and $0 \leq z<12$ apply.

8. A composition as claimed in claim 1 wherein said garnets are surface-modified with one or more additives selected from the following groups:

a) one or more optionally alkoxylated alcohols containing one or more hydroxyl groups b) one or more partly or completely epoxidized unsaturated fatty acids, fatty alcohols and/or derivatives thereof c) one or more of full and partial esters of polyols containing 3 to 30 carbon atoms and 2 to 6 hydroxyl groups with carboxylic acids containing 6 to 22 carbon atoms d) one or more alkyl and aryl phosphites e) one or more homopolymers and copolymers of acrylic acid and methacrylic acid f) one of more of lignin and naphthalene sulfonates and/or trimer fatty acids, and g) one of more salts of fatty acids.

9. A composition as claimed in claim 1 wherein mixture is comprised of:

a) 0.5 to 3 parts by weight of calcium soaps of $C_{8-32}$ fatty acids, 0.1 to 1 part by weight of zinc soaps of $C_{8-32}$ fatty acids, and 1 to 5 parts by weight of said garnets.

10. A composition as claimed in claim 1 wherein said garnets have an average particle diameter of 0.1 to 100 micrometers.

11. A composition as claimed in claim 1 wherein said garnets have an average particle diameter of 0.5 to 30 micrometers.

12. A composition of matter useful as a stabilizer for a polymer based on a halogen-containing vinyl monomer, said composition being a mixture comprising:

a) 0.5 to 3 parts by weight of calcium soaps of $C_{8-32}$ fatty acids b) 0.1 to 1 part by weight of zinc soaps of $C_{8-32}$ fatty acids c) 1 to 5 parts by weight of surface-modified garnets of formula (II):

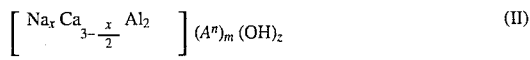  (II)

in which $A^n$ is selected form the group consisting of orthosilicate, borate, hydrogen phosphite, and phosphite, wherein the conditions $0 \leq x<0.7$, $0<m \leq 6$ and $0 \leq z<12$ apply and wherein said surface-modified garnets are surface-modified with one or more additives selected from the following groups:

1) one or more optionally alkoxylated alcohols containing one or more hydroxyl groups 2) one or more partly or completely epoxidized unsaturated fatty acids, fatty alcohols and/or derivatives thereof 3) one or more of full and partial esters of polyols containing 3 to 30 carbon atoms and 2 to 6 hydroxyl groups with carboxylic acids containing 6 to 22 carbon atoms 4) one or more alkyl and aryl phosphites 5) one or more homopolymers and copolymers of acrylic acid and methacrylic acid 6) one of more of lignin and naphthalene sulfonates and/or trimer fatty acids, and 7) one of more salts of fatty acids.

13. A composition as claimed in claim 12 wherein said surface-modified garnets have an average particle diameter of 0.5 to 30 micrometers.

14. In a method of stabilizing a polymer based on a halogen-containing vinyl monomer, the improvement comprising using as a stabilizer a mixtures comprising:

a) calcium soaps of $C_{8-32}$ fatty acids b) zinc soaps of $C_{8-32}$ fatty acids c) optionally surface-modified garnets of formula (I):

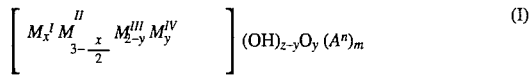  (I)

in which:

$M^I$ is at least one alkali metal ion $M^{II}$ is at least one divalent metal ion $M^{III}$ is at least one trivalent metal ion $M^{IV}$ represents titanium and/or zirconium ions $A^n$ is at least one n-valent acid anion with the charge n=1, 2, 3 or 4 and the following conditions apply: $0 \leq x<1$, $0 \leq y<1$, $0 \leq z<12$, $0<m$, where $y<z$ and $n \cdot m+z=12$.

15. A method as claimed in claim 14 wherein said polymer based on halogen-containing vinyl monomers is polyvinyl chloride.

16. A method as claimed in claim 10 wherein said mixture is comprised of:

a) 0.5 to 3 parts by weight of calcium soaps of $C_{8-32}$ fatty acids b) 0.1 to 1 part by weight of zinc soaps of $C_{8-32}$ fatty acids c) 1 to 5 parts by weight of surface-modified garnets of formula (II):

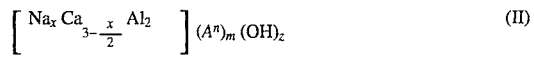  (II)

in which $A^n$ is selected from the group consisting of orthosilicate, borate, hydrogen phosphite, and phosphite, wherein the conditions $0 \leq x<0.7$, $0<m \leq 6$ and $0 \leq z<12$ apply and wherein said surface-modified garnets are surface-modified with one or more additives selected from the following groups:

1) one or more optionally alkoxylated alcohols containing one or more hydroxyl groups
2) one or more partly or completely epoxidized unsaturated fatty acids, fatty alcohols and/or derivatives thereof
3) one or more of full and partial esters of polyols containing 3 to 30 carbon atoms and 2 to 6 hydroxyl groups with carboxylic acids containing 6 to 22 carbon atoms
4) one or more alkyl and aryl phosphites
5) one or more homopolymers and copolymers of acrylic acid and methacrylic acid
6) one of more of lignin and naphthalene sulfonates and/or trimer fatty acids, and
7) one of more salts of fatty acids.

17. A method as claimed in claim 16 wherein said surface-modified garnets have an average particle diameter of 0.5 to 30 micrometers.

* * * * *